Jan. 7, 1964 NOBUTOSHI KIHARA 3,117,239

DEVICE TO COMBINE SEPARATE SIGNALS UTILIZING SYNCHRONIZED SWITCHING MEANS

Filed Oct. 11, 1960 2 Sheets-Sheet 1

Inventor
Nobutoshi Kihara by Hill, Sherman, Meroni, Gross & Simpson Attys.

Jan. 7, 1964 NOBUTOSHI KIHARA 3,117,239

DEVICE TO COMBINE SEPARATE SIGNALS UTILIZING SYNCHRONIZED SWITCHING MEANS

Filed Oct. 11, 1960 2 Sheets-Sheet 2

Inventor
Nobutoshi Kihara by Hill, Sherman, Meroni, Gross & Simpson Attys.

United States Patent Office 3,117,239
Patented Jan. 7, 1964

3,117,239

DEVICE TO COMBINE SEPARATE SIGNALS UTILIZING SYNCHRONIZED SWITCHING MEANS

Nobutoshi Kihara, Tokyo, Japan, assignor to Sony Corporation, a corporation of Japan Filed Oct. 11, 1960, Ser. No. 61,972
Claims priority, application Japan Oct. 15, 1959
7 Claims. (Cl. 307—88.5)

This invention relates to a signal switching device wherein a series of electrical signals derived from separate signal sources are combined to form a single continuous signal without overlapping or drop-out at the edges of the individual signals and wherein means are provided for synchronizing the incoming signals with the switching operations.

An object of this invention is to provide a switching device which is wholly transisterized and, therefore, compact, light and simple in construction.

It is another object of this invention to provide a switching device which is especially adapted for use with a magnetic recorder of video signals.

Other objects, features and advantages of the present invention will be apparent from the following detailed description taken in conjunction with the accompanying figures of the drawings, in which.

One type of apparatus for reproducing video signals recorded on a magnetic tape includes a plurality of magnetic heads which are mounted on a rotating wheel or disk. The tape is drawn past the heads in a direction that is transverse to the plane of the wheel and, as the magnetic heads wipe across the magnetic tape, consecutive magnetic heads are switched into the reproducing circuit. The individual signals from the magnetic heads are then combined by appropriate gating circuits to produce a single continuous video signal.

The gate circuits which are connected to the outputs of the magnetic heads are turned on and off when their associated heads are adjacent the tape by trains of pulses which are synchronized with the rotating wheel. For example, a train of gate signals at 240 c.p.s. can be generated by conventional apparatus that includes a switch and a potential source coupled to the wheel in such a manner as to generate a voltage pulse during a portion of each cycle. A second train of signals at 480 c.p.s. can then be obtained from a conventional voltage doubler circuit. These two trains of signals are applied to the gate circuits to turn them on and off at appropriate intervals.

Figure 2:
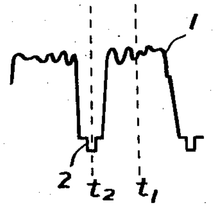
FIGURE 2 is a wave form used to illustrate the operation of the apparatus shown in FIGURE 1.

In an operation such as this, it is desirable that the gate circuits that connect the magnetic heads to the reproducing circuit be turned on and off during the blanking portion of the video signal being reproduced. FIGURE 2 represents a video signal which has a video portion and a blanking portion 2. The gate circuit should be turned on and off at approximately the time $t_2$ during the blanking portion 2 rather than at the time $t_1$ because it is possible that a transient signal generated by the switching operation will be combined with the video portion and deform the reproduced signal. In accordance with the invention, the incoming video signal is synchronized with the gate switching operation so that the switching takes place during the blanking portion 2 of the incoming signal. This is accomplished by taking the horizontal sweep synchronizing signal from the incoming video signal and synchronizing the 480 c.p.s. gate signal with it.

Figure 1:
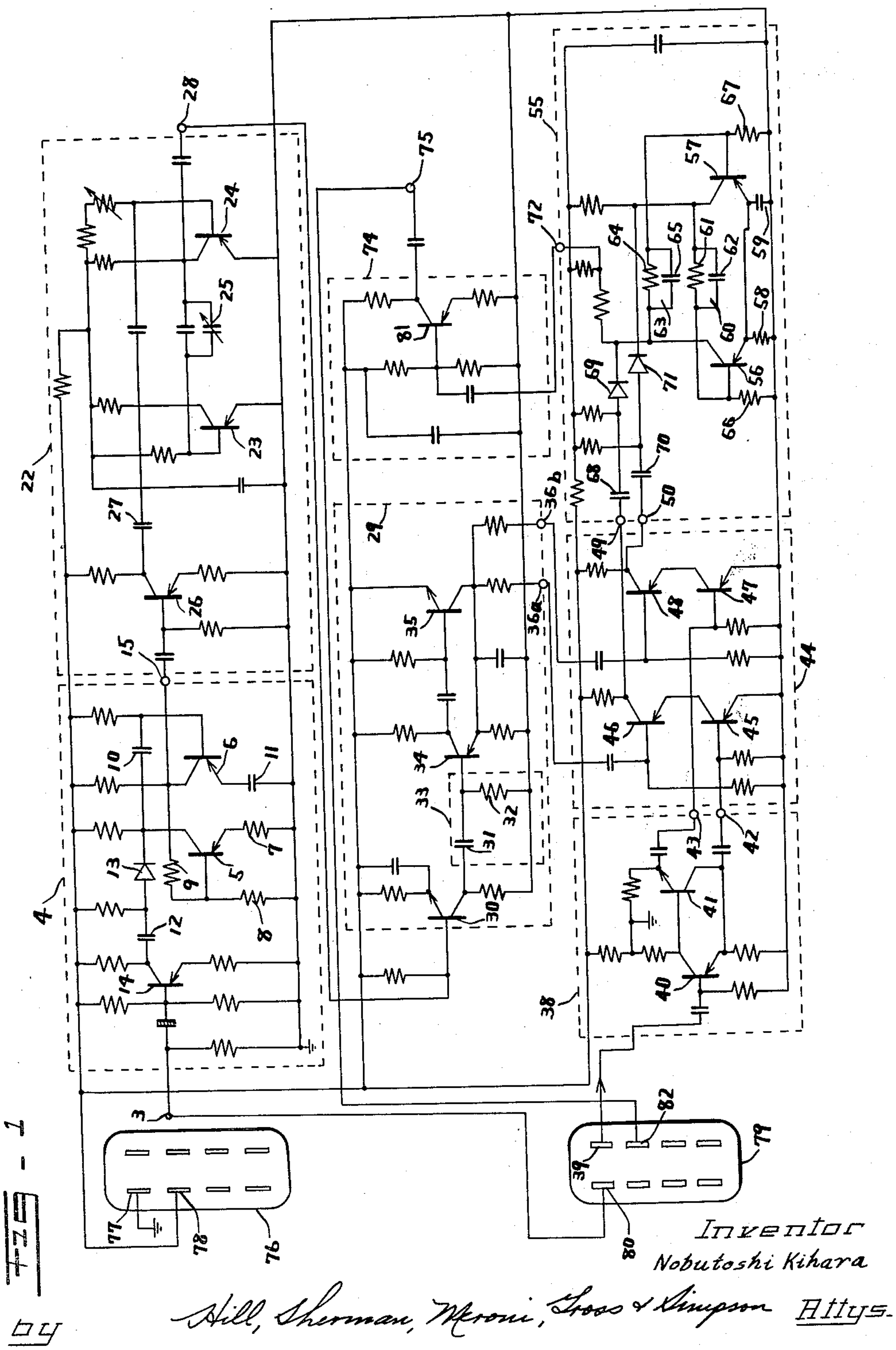
FIGURE 1 is a schematic illustration of a switching device constructed in accordance with the invention.
Figure 3:
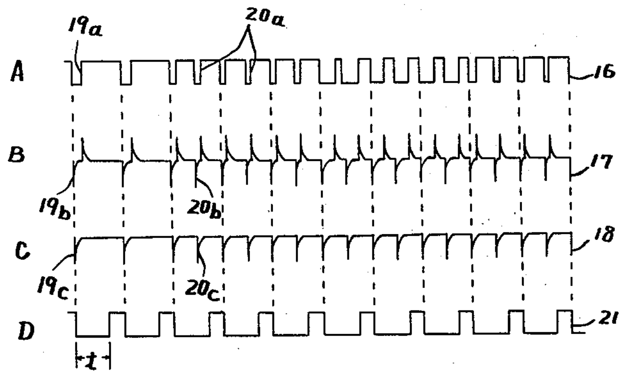
FIGURE 3 is a schedule of wave forms for a portion of the circuit shown in FIGURE 1.

With reference to FIGURE 3A, there is represented the incoming synchronizing signal 19*a* for the horizontal sweep and another pulse signal 20*a* which are picked up from the video tape by conventional means and fed to an input terminal 3, FIGURE 1. Since only the horizontal sweep signals 19*a* are desired, the terminal 3 is connected to a differentiator and multivibrator circuit 4 which is sensitive to the signals 19*a* and insensitive to the signals 20*a* which may be an equalizing pulse signal. The power for this circuit and the other circuits in FIGURE 1 is obtained through a power input plug 76 which can be connected to a suitable power supply. A pin 77 of this plug 76 is connected to ground, while a pin 78 is connected to a potential which is negative with respect to ground. The incoming signal to the terminal 3 is fed to the base electrode of a PNP transistor 14 which amplifies it. A capacitor 12 differentiates the signal to produce the sharp pulses 17, FIGURE 3B. The positive going portion of pulses 17 is eliminated by a diode 13 connected in series with the capacitor 12 as shown by the pulse train 18.

This signal is fed to a monostable multivibrator circuit that includes two PNP transistors 5 and 6, a common emitter resistor 7, a bypass capacitor 11 connected in parallel with the resistor 7, a base electrode resistor 8 for the transistor 5, and a feedback resistor 9 connected between the base electrode of the transistor 5 and the collector electrode of the transistor 6. A coupling capacitor 10 is connected between the collector electrode of the transistor 5 and the base electrode of the transistor 6. The values of the components making up the multivibrator circuit are chosen such that the pulses 19*c* due to the horizontal sweep signals send the multivibrator from its normal state to its timing state, and the time constant of the circuit is such that the mulivibrator does not return to its normal state until the time $t$ has elapsed, FIGURE 3D and the pulse 20*c* is past. It can be seen, therefore, that the multivibrator circuit is sensitive only to the pulses 19*c* since it is still in its timing state at the occurrence of the pulses 20*c*.

The output signal from the multivibrator is taken from the collector electrode of the transistor 6 and is represented by the pulses 21 in FIGURE 3D. This output signal is connected to the output terminal 15 of the circuit 4 which is connected to the input of an amplifying and multivibrator circuit 22. This signal is amplified by a PNP transistor 26 and connected through a coupling capacitor 27 to a freely oscillating or astable multivibrator that includes two PNP transistors 23 and 24. This multivibrator circuit is designed to oscillate at the frequency of occurrence of the pulses 21 which are connected to the base electrode of the transistor 24, so that the astable multivibrator is synchronized with the pulses 21. A variable capacitor 25 is connected between the collector electrode of the transistor 24 and the base electrode of the transistor 23 and determines the width of the output pulses from this multivibrator, which appear at the output terminal 28.

Figure 4:
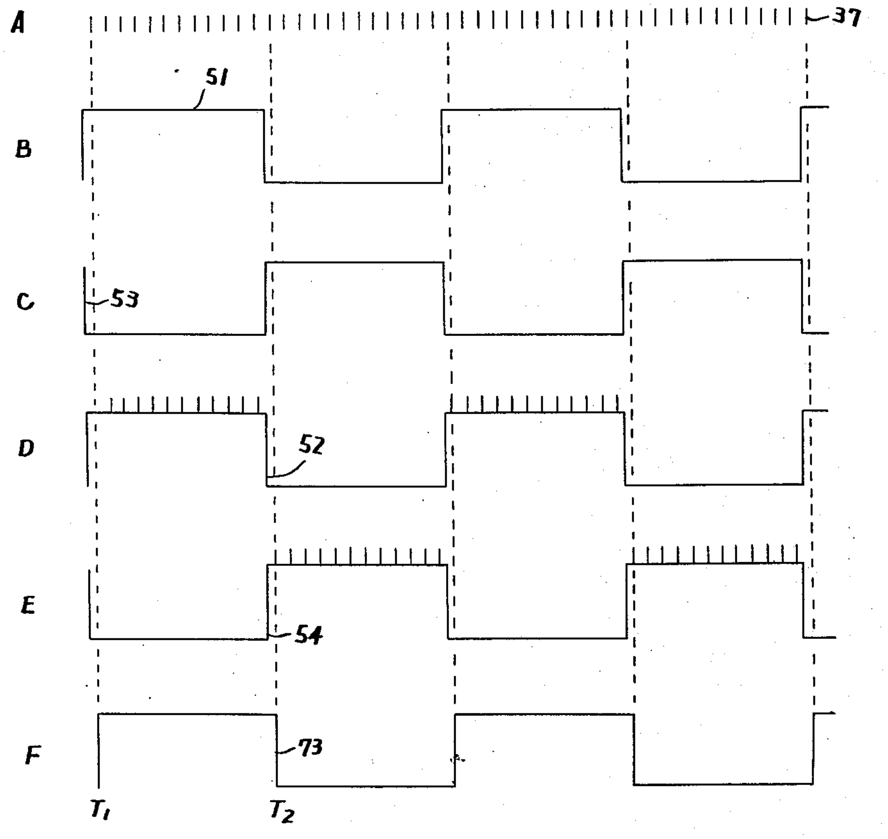
FIGURE 4 is a schedule of wave forms for another portion of the circuit illustrated in FIGURE 1.

This output terminal 28 is connected to the input of an amplifier and the differentiator circuit 29. The incoming signal to the circuit is amplified by an NPN transistor 30 which has its collector electrode connected to the input of a differentiator circuit 33. This differentiator circuit, which includes the capacitor 31 and the resistor 32, produces a train of sharp pulses which are fed to a two-stage amplifier which includes a PNP transistor 34 and an NPN transistor 35. The output from the amplifier circuit is taken off of the collector electrode of the transistor 35 and fed through two resistors to two output terminals $36a$ and $36b$. The signals appearing on these two output terminals are identical and are represented by the pulses 37, FIGURE 4A.

A substantially square wave signal at 480 c.p.s., which can be generated by the apparatus previously described, is also fed into the circuit illustrated in FIGURE 1. This signal is connected to the pin 39 of a plug 79, which also has a pin 80 that is connected to the terminal 3 and the source signals shown in FIGURE 3A. The pin 39 is connected to an amplifying and phase splitting circuit 38 that includes a PNP transistor 40 and a phase splitting NPN transistor 41. The output from this circuit 38 is taken from the output terminals 42 and 43 which are connected to the collector and emitter electrodes, respectively, of the transistor 41. The voltage appearing on the terminal 42 is represented by the signal 51, FIGURE 4B, and the voltage appearing on the terminal 43 is represented by the signal 53, FIGURE 4C, which is 180° out of phase with the signal 51.

These two signals 51 and 53 and the two trains of sharp pulses 37 appearing on the terminals $36a$ and $36b$ are all fed into a gate circuit 44 that includes four PNP transistors 45–48. The gate signal from the terminal 42 is connected to the base electrode of the transistor 45 and the train of sharp pulses from the terminal $36a$ is connected to the base electrode of the transistor 46. The resultant output signal is connected to the output terminal 49 and is represented by wave form 52, FIGURE 4D. The gate signal from the terminal 43 is connected to the base electrode of the transistor 47 and the train of sharp pulses from the terminal $36b$ is connected to the base electrode of the transistor 48. The resultant signal from these two transistors is connected to the output terminal 50 and is represented by the wave form 54, FIGURE 4E.

These two signals 52 and 54 appearing on the terminals 49 and 50 are fed into a bistable multivibrator circuit 55. This circuit includes two PNP transistors 56 and 57 and a common emitter resistor 58 which is connected in parallel with a bypass capacitor 59. The collector electrode of the transistor 57 is connected through a feedback element 60 that includes a resistor 61 and a capacitor 62 to the base electrode of the transistor 56 and a base resistor 66. The collector electrode of the transistor 56 is also connected through an element 63 that includes a resistor 64 and a capacitor 65 to the base electrode of the transistor 57 and a base resistor 67. The signals from the terminals 49 and 50 are connected through two coupling capacitors 68 and 70 and two diodes 69 and 71 to the collector electrodes of the transisors 56 and 57.

Assume that the transistor 56 is initially non-conducting and that transistor 57 is conducting. The signal 52 appearing on the terminal 49 will trigger the transistor 56 to conduction at the first instance when the two signals 51 and 37 appear simultaneously. The transistor 56 then begins to conduct at the time $T_1$, FIGURE 4F. At the time $T_2$ the two signals 53 and 73 appear simultaneously on the terminal 50 and trigger the transistor 57 to conduction and the transistor 56 to non-conduction. It can be seen, therefore, that the output signal 73 appearing on the terminal 72 will be synchronized with both the rotating wheel on which the magnetic heads are mounted and the horizontal synchronizing pulses from the incoming signal.

The terminal 72 is connected to the input of a conventional amplifier circuit 74 that includes a PNP transistor 81. The output of this amplifier circuit is connected to a terminal 75 that is connected to a pin 82 of the plug 79. This output signal 73 at the terminal 82 is connected to the gate circuits that pass the video signals from the magnetic heads in such a manner as to control the operation of these gate circuits.

While the system described herein has been described in its application to the reproduction of video signals recorded on a magnetic tape, it is apparent that the circuit can also be applied to other systems. However, when the apparatus is being used in a video system, the pulses 37 may occur at the rate of 15,750 c.p.s. and the signals 51 and 53 may occur at the rate of 480 c.p.s., although obviously, other frequencies can also be used.

Such a circuit is very advantageous because it can be made sensitive only to a desired synchronizing signal and insensitive to other synchronizing signals and extraneous noise signals. Further, such a circuit controls the gating operation of the video reproducer in such a manner that the gates are turned on and off, during the blanking portion or period of the recorded signals, with the result that there is no danger that the reproduced image will be distorted by transient signals resulting from the switching operation.

It will be apparent that many modifications and variations may be effected without departing from the scope of the novel concepts of the present invention.

I claim as my invention:

1. A signal switching device comprising a monostable multivibrator adapted to be connected to a source of signals in such a manner as to be triggered by said signals, an astable multivibrator connected to the output of said monostable multivibrator in such a manner that said astable multivibrator oscillates at the frequency of occurrence of said signals connected to the input of said monostable multivibrator, a gate circuit connected to the output of said astable multivibrator, said astable multivibrator also being adapted to be connected to a source of second signals in such a manner that such gate circuit passes simultaneously said second signals and the output from said astable multivibrator, and means responsive to the combined signals from said gate circuit for producing a gating signal that is synchronized with said signal input to said monostable multivibrator.

2. A signal switching device having first and second signal inputs comprising a monostable multivibrator connected to be responsive to said first signal input, an astable multivibrator connected to be responsive to the output from said monostable multivibrator, said astable multivibrator being adapted to produce a signal at the frequncy of said first signal input, a differentiator circuit connected to the output of said astable multivibrator, a gate circuit connected to be responsive to the output from said differentiator circuit and to said second signal input, said gate circuit producing a resultant signal that is combination of said second signal input and said output from said differentiator circuit, and a bistable multivibrator connected to be triggered by the output of said gate circuit and produce a signal which is synchronized with said first signal input.

3. A signal switching device comprising a monostable multivibrator which is connected to a first signal input which is adapted to be connected to a plurality of synchronizing signals, the delay time of said monostable multivibrator being such that said multivibrator is sensitive only to one of said plurality of synchronizing signals, an astable multivibrator connected to be responsive to said output signals from said monostable multivibrator, said astable multivibrator being locked to the frequency of the output of said monostable multivibrator, a differentiator circuit connected to the output of said astable multivibrator for producing a train of relatively sharp pulses, a phase splitting circuit conneced to a second signal input, said phase splitting circuit being adapted to produce first and second gate signals which are 180° out of phase, a gate circuit connected to be responsive to said first and second gate signals and to said train of sharp pulses from said differentiator circuit, said gate circuit being adapted to produce first and second resultant signals which are combinations of said first and second gating signals and said train of sharp pulses from said differentiator circuit, and a bistable multivibrator adapted to be responsive to said first and second resultant signals and to be triggered to a first state by said first resultant signal and to be triggered to a second state by said second resultant signal.

4. A signal switching device having at least first and second signal inputs, a half wave differential circuit connected to said first signal input comprising a capacitor and a diode connected in series, a monostable multivibrator connected to the output of said half wave differential circuit, said monostable multivibrator comprising two transistors which have their emitter electrodes connected to a common emitter resistor and a bypass capacitor, and a feedback resistor connected between the collector electrode of one of said transistors and the base electrode of the other of said transistors, an astable multivibrator connected to the output of said monostable multivibrator for producing a signal which is synchronized with the signal output from said monostable multivibrator, a gate circuit which is responsive to the output of said astable multivibrator and to said second signal input which is adapted to produce a resultant signal, and a bistable multivibrator connected to the output of said gate circuit.

5. A signal switching device having at least first and second signal inputs comprising means for producing a substantially square wave signal which is synchronized with the signals appearing at said first signal input, a differentiator circuit connected to the output of said means for producing a train of relatively sharp pulses, a gate circuit connected to the output of said differentiator circuit and to said second signal input for producing a resultant signal, and a bistable multivibrator connected to the output of said gate circuit, said bistable multivibrator comprising first and second transistors, said base electrode of said first transistor being connected through a feedback element to the collector electrode of said second transistor and said base electrode of said second transistor being connected through a second feedback element to the collector electrode of said first transistor, each of said first and second transistors including a resistor and a capacitor connected in series, and the collector electrode of each of said first and second transistors being connected to the output of said gate circuit through a diode and a capacitor connected in series.

6. In a system for producing an output signal in response to first and second input signals, said first input signal including pulses having leading edges occurring at regular intervals at a certain frequency and said second signal being a square wave signal at a frequency substantially lower than said certain frequency, means responsive to said first input signal for producing blanking pulses occurring at said regular intervals, means responsive to said second input signal for producing two square wave gating signals in phase opposition, means for combining said two square wave signals and said blanking pulses to produce two timing control signals wherein said blanking pulses are superimposed on said gating signals, and a multivibrator having two inputs responsive to said timing control signals to be triggered in proximate coincidence with leading and trailing edges of said second input signal and in exact synchronism with said blanking pulses.

7. In a system for producing an output signal in response to first and second input signals, said first input signal being a composite television synchronizing signal including horizontal and vertical synchronizing pulses and equalizing pulses wherein the leading edges of the horizontal and vertical synchronizing pulses and certain of the equalizing pulses occur at regular intervals at a certain line frequency and wherein the leading edges of others of said equalizing pulses occur at times in the middle of said regular line intervals, said second input signal being a square wave signal at a frequency substantially lower than said certain line frequency, a monostable multivibrator arranged to respond to leading edges of pulses in said composite synchronizing signal to switch from one state to another for a time interval slightly less than a regular line interval to be non-responsive to said leading edges of said others of said equalizing pulses, a second multivibrator operative at said lower frequency, and means responsive to said second input signal and to said monostable multivibrator for triggering said second multivibrator in approximate coincidence with leading and trailing edges of said square wave signal and in substantially exact synchronism with triggering of said monostable multivibrator.

References Cited in the file of this patent

UNITED STATES PATENTS

| | | |
|---|---|---|
| 2,418,127 | Labin | Apr. 1, 1947 |
| 2,513,910 | Bliss | July 4, 1950 |